United States Patent
Alibay et al.

(10) Patent No.: US 10,268,929 B2
(45) Date of Patent: Apr. 23, 2019

(54) METHOD AND DEVICE FOR GENERATING BINARY DESCRIPTORS IN VIDEO FRAMES

(71) Applicant: STMicroelectronics SA, Montrouge (FR)

(72) Inventors: Manu Alibay, Vincennes (FR); Stéphane Auberger, Saint-Maur-des-Fosses (FR); Bogdan-Florin Stanciulescu, Paris (FR)

(73) Assignee: STMicroelectronics SA, Montrouge (FR)

( * ) Notice: Subject to any disclaimer, the term of this patent is extended or adjusted under 35 U.S.C. 154(b) by 63 days.

(21) Appl. No.: 15/381,919

(22) Filed: Dec. 16, 2016

(65) Prior Publication Data

US 2017/0177980 A1 Jun. 22, 2017

(30) Foreign Application Priority Data

Dec. 17, 2015 (FR) ...................................... 15 62587
Nov. 18, 2016 (EP) .................................... 16199465

(51) Int. Cl.
*H04N 5/232* (2006.01)
*G06K 9/62* (2006.01)
(Continued)

(52) U.S. Cl.
CPC .............. *G06K 9/6289* (2013.01); *G06K 9/46* (2013.01); *G06T 7/246* (2017.01); *H04N 5/2329* (2013.01);
(Continued)

(58) Field of Classification Search
CPC ................... G06K 9/6289; G06K 9/46; G06K 2009/4666; G06T 7/246;
(Continued)

(56) References Cited

U.S. PATENT DOCUMENTS 7,349,583 B2 * 3/2008 Kumar .................. H04N 19/61
    345/648
9,430,847 B2 8/2016 Ramalingam et al.
(Continued)

FOREIGN PATENT DOCUMENTS

EP 3 182 371 A1 6/2017
FR 3 027 144 A1 4/2016

OTHER PUBLICATIONS

Calonder et al, Brief: Computing a local binary descriptor very fast (Year: 2012).*
(Continued)

*Primary Examiner* — Shan E Elahi
(74) *Attorney, Agent, or Firm* — Seed IP Law Group LLP

(57) ABSTRACT

A method generates a binary descriptor associated with a given point in a current frame of a succession of video frames obtained by an apparatus such as an image sensor. The method includes determining a pattern of points pairs around said given point in the current frame, and performing intensity comparison processing between the two points of each pair. The apparatus is likely to move in a rotation between the previous frame and the current frame. The method includes processing the pattern of points of the current frame with tridimensional rotation information representative of the apparatus rotation between the previous frame and the current frame and obtained from inertial measurements provided by at least one inertial sensor.

20 Claims, 7 Drawing Sheets

(51) Int. Cl.
*G06K 9/46* (2006.01)
*G06T 7/246* (2017.01)

(52) U.S. Cl.
CPC ..... *H04N 5/23238* (2013.01); *H04N 5/23254* (2013.01); *H04N 5/23258* (2013.01); *H04N 5/23267* (2013.01); *G06K 2009/4666* (2013.01); *G06T 2207/10016* (2013.01); *G06T 2207/30244* (2013.01)

(58) Field of Classification Search
CPC ........... G06T 2207/30244; G06T 2207/10016; H04N 5/23238; H04N 5/23254; H04N 5/23258; H04N 5/23267; H04N 5/2329
USPC .......................................................... 348/36
See application file for complete search history.

(56) References Cited

U.S. PATENT DOCUMENTS

| | | | |
|---|---|---|---|
| 2001/0033692 A1* | 10/2001 | Borneo | H04N 17/00 382/205 |
| 2005/0094852 A1* | 5/2005 | Kumar | H04N 19/61 382/107 |
| 2005/0105627 A1* | 5/2005 | Sun | H04N 5/21 375/240.29 |
| 2005/0182518 A1 | 8/2005 | Karlsson | |
| 2008/0137908 A1 | 6/2008 | Stein et al. | |
| 2011/0153206 A1 | 6/2011 | Kotaba et al. | |
| 2011/0169923 A1 | 7/2011 | Dellaert et al. | |
| 2011/0285811 A1 | 11/2011 | Langlotz et al. | |
| 2011/0299735 A1 | 12/2011 | Anisimovich et al. | |
| 2012/0070037 A1 | 3/2012 | Polle | |
| 2012/0121161 A1 | 5/2012 | Eade et al. | |
| 2012/0281922 A1 | 11/2012 | Yamada et al. | |
| 2013/0080045 A1* | 3/2013 | Ma | G01S 17/89 701/408 |
| 2014/0212027 A1 | 7/2014 | Hallquist et al. | |
| 2014/0355832 A1 | 12/2014 | Thouy et al. | |
| 2015/0099025 A1* | 4/2015 | Spalt | B33Y 30/00 425/166 |
| 2015/0142248 A1 | 5/2015 | Han et al. | |
| 2015/0304634 A1* | 10/2015 | Karvounis | H04N 13/239 348/46 |
| 2015/0312719 A1 | 10/2015 | Cho et al. | |
| 2016/0034452 A1* | 2/2016 | Ramanathan | G06F 17/30799 707/747 |
| 2017/0178347 A1 | 6/2017 | Alibay et al. | |
| 2017/0178355 A1* | 6/2017 | Alibay | G06T 7/70 |
| 2017/0180644 A1 | 6/2017 | Alibay et al. | |

OTHER PUBLICATIONS

Comaniciu et al, Density Estimation-based information fusion for multiple motion computation (Year: 2002).*

Calonder et al, (hereafter Calonder) Brief: Computing a local binary descriptor very fast (Year: 2012).*

Klingbeil et al., "A Wireless Sensor Network for Real-time Indoor Localization and Motion Monitoring," 2008 International Conference on Information Processing in Sensor Networks, St. Louis, MO, Apr. 22-24, 2008, 12 pages.

Kneip et al., "Robust Real-Time Visual Odometry with a Single Camera and an IMU," The 22$^{nd}$ British Machine Vision Conference, Dundee, Scotland, Aug. 29-Sep. 2, 2011, 11 pages.

Liang et al., "Reduced-Complexity Data Acquisition System for Image-Based Localization in Indoor Environments," 2013 International Conference on Indoor Positioning and Indoor Navigation, Montbéliard-Belfort, France, Oct. 28-31, 2013, 9 pages.

Merzban et al., "Toward Multi-Stage Decoupled Visual SLAM System," 2013 IEEE International Symposium on Robotic and Sensors Environments (ROSE), Washington, DC, Oct. 21-23, 2013, 6 pages.

Tanaka et al., "Incremental RANSAC for Online Relocation in Large Dynamic Environments," 2006 IEEE International Conference on Robotics and Automation, Orlando, FL, May 15-19, 2006, 8 pages.

Voigt et al., "Robust Embedded Egomotion Estimation," 2011 IEEE/RSJ International Conference on Intelligent Robots and Systems, San Francisco, CA, Sep. 25-30, 2011, 6 pages.

Ababsa et al., "Inertial and Vision Head Tracker Sensor Fusion Using a Particle Filter for Augmented Reality Systems," 2004 International Symposium on Circuits and Systems, Vancouver, BC, Canada, May 23-26, 2004, 4 pages.

Armesto et al., "On multi-rate fusion for non-linear sampled-data systems: Application to a 6D tracking system," *Robotics and Autonomous Systems* 56:706-715, 2008.

Bleser et al., Using Optical Flow for Filling the Gaps in Visual-Inertial Tracking, 18th European Signal Processing Conference, Aalborg, Denmark, Aug. 23-27, 2010, 5 pages.

Huster et al., "Relative Position Estimation for Intervention-Capable AUVS by Fusing Vision and Inertial Measurements," 12th International Symposium on Unmanned Untethered Submersible Technology, Durham, New Hampshire, Aug. 2001, 11 pages.

Li et al., "A Reliable and Accurate Indoor Localization Method Using Phone Inertial Sensors," 14th ACM International Conference on Ubiquitous Computing, Pittsburgh, Pennsylvania, Sep. 5-8, 2012, 10 pages.

Trawny et al., "Vision-Aided Inertial Navigation for Pin-Point Landing using Observations of Mapped Landmarks," *Journal of Field Robotics* 24(5):357-378, 2007.

Vernaza et al., "Rao-Blackwellized Particle Filtering for 6-DOF Estimation of Attitude and Position via GPS and Inertial Sensors," 2006 IEEE International Conference on Robotics and Automation, Orlando, Florida, May 15-19, 2006, 8 pages.

Alahi et al., "FREAK: Fast Retina Keypoint," *2012 IEEE Conference on Computer Vision andPattern Recognition (CVPR)*, Providence, Rhode Island, Jun. 16-21, 2012, pp. 510-517.

Alibay et al., "Hybrid Visual and Inertial Ransac for Real-Time Motion Estimation," *2014 IEEE International Conference on Image Processing (ICIP)*, Paris, France, Oct. 27-30, 2014, pp. 179-183.

Alibay, "Extended sensor fusion for embedded video applications," Thesis to obtain a Doctorate in Computer Science and Robotics from the Paris Institute of Technology, Dec. 18, 2015, 138 pages.

Calonder et al., "BRIEF: Binary Robust Independent Elementary Features," *11$^{th}$ European Conference on Computer Vision*, Hersonissos, Greece, Sep. 5-11, 2010, 14 pages.

Calonder et al., "BRIEF: Computing a Local Binary Descriptor Very Fast," *IEEE Transactions on Pattern Analysis and Machine Intelligence* 34(7):1281-1298, Jul. 2012.

Civera et al., "1-Point RANSAC for EKF Filtering. Application to Real-Time Structure from Motion and Visual Odometry," *2009 IEEE/RSJ International Conference on Intelligent Robots and Systems (IROS 2009)*, St.Louis, Missouri, Oct. 10-15, 2009, 32 pages.

Davison, "MonoSLAM: Real-Time Single Camera SLAM," *IEEE Transactions on Pattern Analysis and Machine Intelligence* 29(6):1052-1067, Jun. 2007.

Davison, "Real-Time Simultaneous Localisation and Mapping with a Single Camera," *Proceedings of the Ninth IEEE International Conference on Computer Vision (ICCV'03)*, Nice, France, Oct. 13-16, 2003, 8 pages.

Dubrofsky, "Homography Estimation," A master's essay submitted in partial fulfillment of the requirements for the degree of Master of Science in the Faculty of Graduate Studies (Computer Science) from the University of British Columbia (Vancouver), 32 pages, Mar. 2009.

Durrie et al., "Vision-Aided Inertial Navigation on an Uncertain Map Using Particle Filter," *2009 IEEE International Conference on Robotics and Automation*, Kobe, Japan, May 12-17, 2009, pp. 4189-4194.

Fischler et al., "Random Sample Consensus: A Paradigm for Model Fitting with Applications to Image Analysis and Automated Cartography," *Communications of the ACM* 24(6):381-395, Jun. 1981.

Hartley et al., *Multiple View Geometry in Computer Vision*, Cambridge, UK, Cambridge University Press, 2003, 673 pages.

(56) References Cited

OTHER PUBLICATIONS

Hartley, "In Defence of the 8-point Algorithm" $5^{th}$ IEEE International Conference on Computer Vision, Cambridge, Massachusetts, Jun. 20-23, 1995, pp. 1064-1070.
Holmes et al., "An $O(N^2)$ Square Root Unscented Kalman Filter for Visual Simultaneous Localization and Mapping," IEEE Transactions on Pattern Analysis and Machine Intelligence 31(7):1251-1263, Jul. 2009.
Horn et al., "Determining Optical Flow," Artificial Intelligence 17(1-3):185-203, Aug. 1981.
Hwangbo et al., "Inertial-Aided KLT Feature Tracking for a Moving Camera," 2009 IEEE/RSJ International Conference on Intelligent Robots and Systems, St. Louis, Missouri, Oct. 11-15, 2009, pp. 1909-1916.
Jia et al., "Probabilistic 3-D Motion Estimation for Rolling Shutter Video Rectification from Visual and Inertial Measurements," $14^{th}$ IEEE International Workshop on Multimedia Signal Processing (MMSP), Banff, Canada, Sep. 17-19, 2012, pp. 203-208.
Julier et al., "A New Extension of the Kalman Filter to Nonlinear Systems," Proceedings of SPIE 3068, Signal Processing, Sensor Fusion, and Target Recognition VI, Orlando, Florida, Apr. 21, 1997, 12 pages.
Kalman, "A New Approach to Linear Filtering and Prediction Problems," Journal of Basic Engineering 82(1):35-45, Mar. 1960.
Karpenko et al., "Digital Video Stabilization and Rolling Shutter Correction using Gyroscopes," Stanford Tech Report CTSR Mar. 2011, 7 pages.
Klein et al., "Parallel Tracking and Mapping for Small AR Workspaces," $6^{th}$ IEEE and ACM International Symposium on Mixed and Augmented Reality, Nara, Japan, Nov. 13-16, 2007, 10 pages.
Kurz et al., "Gravity-Aware Handheld Augmented Reality," IEEE International Symposium on Mixed and Augmented Reality 2011, Basel, Switzerland, Oct. 26-29, 2011, pp. 111-120.
Kurz et al., "Handheld Augmented Reality involving gravity measurements," Computers & Graphics 36:866-883, 2012.
Lepetit et al., "EPnP: An Accurate O(n) Solution to the PnP Problem," International Journal of Computer Vision 81(2):155-166, 2009.
Leutenegger et al., "BRISK: Binary Robust Invariant Scalable Keypoints," 2011 IEEE International Conference on Computer Vision, Barcelona, Spain, Nov. 6-13, 2011, 8 pages.
Liu et al., "Sequential Monte Carlo Methods for Dynamic Systems," Journal of the American Statistical Association 93(443):1032-1044, Sep. 1998.
Lobo et al., "Vision and Inertial Sensor Cooperation Using Gravity as a Vertical Reference," IEEE Transactions on Pattern Analysis and Machine Intelligence 25(12):1597-1608, Dec. 2003.
Lowe, "Distinctive Image Feature from Scale-Invariant Keypoints," International Journal of Computer Vision 60(2):91-110, Nov. 2004.
Montemerlo et al., "FastSLAM: A Factored Solution to the Simultaneous Localization and Mapping Problem," Proceedings of the $18^{th}$ National Conference on Artificial Intelligence, Edmonton, Canada, Jul. 28-Aug. 1, 2002, 6 pages.
Mourikis et al., "A Multi-State Constraint Kalamn Filter for Vision-aided Inertial Navigation," 2007 IEEE International Conference on Robotics and Automation, Rome, Italy, Apr. 10-14, 2007, 8 pages.
Murray et al., A Mathematical Introduction to Robotic Manipulation, CRC Press, 1994, 474 pages.
Nistér, "An Efficient Solution to the Five-Point Relative Pose Problem," IEEE Transactions on Pattern Analysis and Machine Intelligence 26(6):756-770, Apr. 2004.
Nistér, "Preemptive RANSAC for Live Structure and Motion Estimation," Proceedings of the $9^{th}$ IEEE International Conference on Computer Vision, 2003, pp. 199-206.
Rosten et al., "Faster and Better: A Machine Learning Approach to Corner Detection," IEEE Transactions on Pattern Analysis and Machine Intelligence 32(1):105-199, Jan. 2010.
Rosten et al., "Machine learning for high-speed corner detection," $9^{th}$ European Conference on Computer Vision, Graz, Austria, May 7-13, 2006, 14 pages.
Rublee et al., "ORB: an efficient alternative to SIFT or SURF," 2011 IEEE International Conference on Computer Vision, Barcelona, Spain, Nov. 6-13, 2011, 8 pages.
Scaramuzza et al., "Tutorial: Visual Odometry Part I: The First 30 Years and Fundamentals," IEEE Robotics & Automation Magazine 18(4):80-92, Dec. 2011.
Shoemake, "Animating Rotation with Quaternion Curves," ACM SIGGRAPH Computer Graphics 19(3):245-254, Jul. 1985.
Strasdat et al., "Real-time Monocular SLAM: Why Filter?," 2010 IEEE International Conference on Robotics and Automation, Anchorage, Alaska, May 3-8, 2010, pp. 2657-2644.
Triggs et al., "Bundle Adjustment—A Modern Synthesis," Vision Algorithms: Theory and Practice 1883:298-372, 2000.
You et al., "Fusion of Vision and Gyro Tracking for Robust Augmented Reality Registration," Proceedings of the IEEE Virtual Reality 2001 Conference, Yokohama, Japan, Mar. 13-17, 2001, 8 pages.
You et al., "Hybrid Inertial and Vision Tracking for Augmented Reality Registration," Proceedings of the IEEE Virtual Reality 1999 Conference, Houston, Texas, Mar. 13-17, 1999, 8 pages.
You et al., "Orientation Tracking for Outdoor Augmented Reality Registration," IEEE Computer Graphics and Applications 19(6):36-42, Nov./Dec. 1999.
Zhang, "A Flexible New Technique for Camera Calibration," IEEE Transactions on Pattern Analysis and Machine Intelligence 22(11):1330-1334, Nov. 2000.
Eade et al., "Edge landmarks in monocular SLAM," Image and Vision Computing 27:588-596, 2009.
Hilsenbeck et al., "Graph-based Data Fusion of Pedometer and WiFi Measurements for Mobile Indoor Positioning," 2014 ACM International Joint Conference on Pervasive and Ubiquitous Computing (UbiComp 2014), Seattle, WA, Sep. 13-17, 12 pages.
Lim et al., "Real-Time 6-DOF Monocular Visual SLAM in a Large-Scale Environment," 2014 IEEE International Conference on Robotics & Automation (ICRA), Hong Kong, China, May 31-Jun. 7, 2014, 8 pages.
Kurz et al., "Inertial sensor-aligned visual feature descriptors," 2011 IEEE Conference on Computer Vision and Pattern Recognition (CVPR), Colorado Springs, CO, Jun. 20-25, 2011, 6 pages.
Levi, "Adding rotation invariance to the BRIEF descriptor," Gil 's CV blog, Jan. 2, 2015, retrieved from https://gilscvblog.com/2015/01/02/adding-rotation-invariance-to-the-brief-descriptor/ on Apr. 25, 2017, 20 pages.
Moulon et al., "Adaptive Structure from Motion with a Contrario Model Estimation," in Lecture Notes in Computer Science 7727—Asian Conference on Computer Vision 2012 Part IV, Lee et al. (eds.), Springer-Verlag Berlin Heidelberg, 2013, pp. 257-270.
Hafez et al., "Particle-filter-based Pose Estimation from Controlled Motion with Application to Visual Servoing," International Journal of Advanced Robotics Systems 11(10):177, 2014. (11 pages).
Oka et al., "Head Pose Estimation System Based on Particle Filtering with Adaptive Diffusion Control," MVA—IAPR Conference on Machine VIsion Applications, Tsukuba Science City, Japan, May 16-18, 2005, pp. 586-589.
Leizea et al., "Real time non-rigid 3D surface tracking using particle filter," Computer Vision and Image Understanding 133:51-65, 2015.

\* cited by examiner

Frame coordinates            World coordinates

METHOD AND DEVICE FOR GENERATING BINARY DESCRIPTORS IN VIDEO FRAMES

BACKGROUND

Technical Field

Embodiments of the disclosure relate to sensor fusion between a video sensor, for example a camera, and inertial sensors (such as gyroscope, accelerometers . . . ) measurements in order to provide a robust motion estimation algorithm for embedded video applications, and more particularly to the generation of binary descriptors describing areas around points or pixels of an image taking into account an eventual rotation of a video apparatus, for example a camera, between two successive images (or frames) of a sequence of images including scenes in motion. The targeted platforms are mainly smartphones and tablets.

Description of the Related Art

There are a lot of application domains for fusion of inertial sensors in embedded platforms, from Unmanned Aerial Vehicles (UAVs) navigation to smartphone applications. For the smartphones and tablets it targets mainly gaming, orientation awareness, pedestrian step counting, etc.

BRIEF SUMMARY

According to an embodiment, it is proposed to compute accurately the motion occurring in a video sequence in real time between successive video images including generating binary descriptors capable to be representative of rotation of the apparatus within an image in motion, and adapted to be used in low complexity algorithms such as those implemented in platforms having limited computation resources, as for example smartphones or tablets.

The binary descriptor feeds for example real time applications embedded in a system processor, combining data from image sensors and at least one inertial sensor, as for example a gyroscope or an accelerometer.

According to an embodiment, it is proposed to provide a valuable addition to binary descriptors, in order to improve their robustness to geometric variations such as in-plane rotation or viewpoint changes.

According to an aspect, a method is proposed for generating a binary descriptor associated with a given point in a current frame of a succession of video frames obtained by an image sensor (or apparatus) belonging for example to a platform, comprising determining a pattern of points pairs around said given point in the current frame, and performing intensity comparison processing between the two points of each pair.

According to a general feature of this aspect, said apparatus is likely to move in a rotation between the previous frame and the current frame, and generating said binary descriptor further comprises processing said pattern of points of said current frame with a tridimensional rotation information representative of said apparatus rotation between the previous frame and the current frame (instead of processing the whole current image with said tridimensional rotation information).

According to an embodiment, said tridimensional rotation information is obtained from inertial measurements.

According to an embodiment processing said pattern of points of said current frame comprises, for each point of each pair of said pattern, determining the bidimensional coordinates of said point from the bidimensional coordinates of the homologue point in the previous frame and from an in-plane rotation matrix corresponding to an in-plane rotation of an in-plane angle, for example the roll angle, around said given point, converting said determined bidimensional coordinates of said point into tridimensional coordinates, determining a second rotation matrix representative of said tridimensional rotation information, taking into account for example the yaw angle and the pitch angle, and applying said second rotation matrix to said tridimensional coordinates of said point to obtain new tridimensional coordinates, projecting said new tridimensional coordinates back onto said plane of said in-plane rotation (plane of the current frame) to obtain a projected point having projected coordinates in the plane of the current frame.

According to an embodiment performing intensity comparison processing between the two points of each pair comprises determining the intensity of the two projected points of said pair and comparing both intensities.

According to an embodiment said given point (p0) is the origin of each points pair.

According to an embodiment said pattern of points comprises pairs of points included in a zone of L×M points, for example 25×25, points centered on said given point.

According to an embodiment said given point is a keypoint of said current frame.

According to an embodiment said platform is a smartphone or a tablet.

According to another aspect a device is proposed comprising generating means configured to generate a binary descriptor associated with a given point in a current frame of a succession of video frames obtained by an image sensor (or apparatus), said generating means comprising first means configured to determine a pattern of points pairs around said given point in the current frame, and comparison means configured to perform intensity comparison processing between the two points of each pair.

According to a general feature of this another aspect, said apparatus is likely to move in a rotation between the previous frame and the current frame, and said generating means further comprises processing means configured to process said pattern of points of said current frame with a tridimensional rotation information representative of said apparatus rotation between the previous frame and the current frame.

According to an embodiment said tridimensional rotation information is obtained from inertial measurements provided by at least one inertial sensor.

According to an embodiment said processing means comprises a processing module configured, for each point of each pair of said pattern, to determine the bidimensional coordinates of said point from the bidimensional coordinates of the homologue point in the previous frame and from an in-plane rotation matrix corresponding to an in-plane rotation of an in-plane angle around said given point, to convert said determined bidimensional coordinates of said point into tridimensional coordinates, to determine a second rotation matrix representative of said tridimensional rotation information and to apply said second rotation matrix to said tridimensional coordinates of said point to obtain new tridimensional coordinates, and to project said new tridimensional coordinates back onto said plane of said in-plane rotation to obtain a projected point having projected coordinates.

According to an embodiment said comparison means are configured to determine the intensity of the two projected points of said pair and to compare both intensities.

According to an embodiment said given point is the origin of each points pair.

According to an embodiment said pattern of points comprises pairs of points included in a zone of L×M points, for example 25×25, points centered on said given point.

According to an embodiment said given point is a keypoint of said current frame.

According to another aspect of the disclosure a platform, for example a smartphone or a tablet, is proposed comprising an apparatus and a device as defined above.

BRIEF DESCRIPTION OF THE SEVERAL VIEWS OF THE DRAWINGS

Other advantages and features of the disclosure will appear in the detailed description below and in the appended drawings which are no limitative, in which.

DETAILED DESCRIPTION

Figure 1:
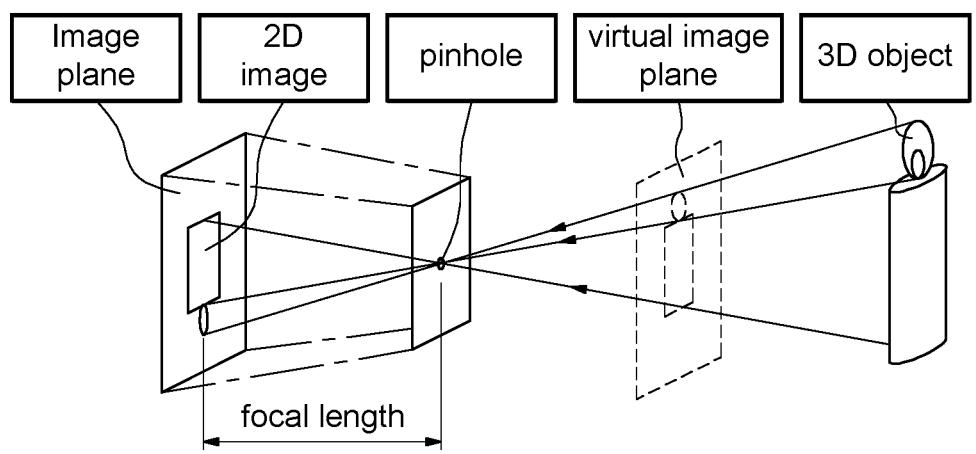
FIG. 1 illustrates a pinhole camera model

With the massive popularity of smartphones and tablets, various applications are developed on those devices. Part of them concern video-related content: improving the quality of the video sequence, computing semantic information on the content of the scene, superimposing contents for augmented reality or gaming . . . . A key step in many of these applications is to estimate the motion of the platform. In order to perform this, one can use directly the camera recordings or other sensors available on the smartphone or tablet, such as the inertial sensors. A goal of this disclosure is to perform sensor fusion between the camera and inertial sensors measurements for these embedded video applications in particular for a robust generation of binary descriptors.

Fusion methods between a video sensors and inertial sensors can lead to or improve many potential applications. This type of fusion can lead in particular to video quality improvements.

Main video applications for embedded platforms are: video stabilization, panorama creation (up to 360 degrees with loop closure), temporal denoising, or increase of the dynamic by multiple frame alignment. Camera motion estimation is a key step in those applications.

To estimate the camera motion on a smartphone or a tablet, two main sources of information are very relevant: inertial sensors and visual strategies.

Sensors fusion combined with classical motion estimation techniques should allow an improvement of the robustness of many algorithms based on camera motion. This should remove ambiguities that occur in many purely visual analyses: distinction between local and global motion, immunity to light changes, noise, low textured scenes. Overall this fusion should lead to an improvement of the vision-based motion estimation without loss in accuracy.

Furthermore, some of these methods make use of extraction of points of interest or keypoints to compute the motion between frames. Inertial data can also produce additional information for a better selection and tracking of these points. This could include prediction of the displacement of points, or the deletion of some constraints of certain descriptors.

Many possible sensors can be utilized in order to estimate motion for an embedded platform in a video application.

Cameras are a very straightforward choice, as the video sequence is the direct target of the application. Many techniques have been developed in order to estimate motion based on the video sequence, and many are already integrated in industrial applications such as video stabilization, panorama creation, tracking, video encoding, etc. Computing the motion from the video sequence alone is not a simple task, especially when the device is handheld, leading to artifacts and difficult cases.

When a device with the camera is handheld, it can undergo high motions (often corresponding to wrist twists). Heavy movements not only lead to specific steps or considerations in the motion estimation process, but they can also lead to visual artifacts. A commonly known issue is motion blur. As motion occurs while recording a scene during the exposure time, pixels do not record the same place. This implies that nearby pixels will influence the final recording of a pixel, degrading the image quality.

Embedded cameras are often based on CMOS (Complementary Metal-Oxide-Semiconductor) transistors. The specificity of this type of camera is that pixel rows are recorded sequentially rather than simultaneously. This technique is called the Rolling Shutter. A motion occurring between the acquisitions of the lines can lead to distortions in the image, not only degrading image quality but also the motion estimation to a lesser extent. Rolling Shutter distortions can lead to skewed images as well as stretches or compressions.

While these types of effects are often considered as an image quality degradation, they can also affect the motion estimation process because of the geometric changes that they apply on the images. Furthermore, embedded cameras have lower field of view than usual cameras, leading to a lesser angle of the scene recorded, lowering the amount of usable information. They also have a lower resolution, leading to a less detailed content. To conclude, embedded motion estimation induces heavy difficulties in terms of robustness to large motions and its consequences in terms of artifacts and distortions.

Most recent smartphones and tablets have inertial sensors integrated in their hardware. The three widely used types of inertial sensors are the gyroscope, the accelerometer and the magnetometer. Most embedded inertial sensors are MEMS (microelectromechanical systems), notably known for their low consumption and volume.

Each type of sensor possesses its own characteristics and they can be used directly or fused to perform a large range of applications.

The fusion process may consist in performing an estimation using measurements from multiple sensor types. This allows to overcome specific drawbacks from each sensor, even if some remain even after using fusion techniques. More particularly the fusion process may comprise utilizing the measurements from the three sensors simultaneously in order to compute the 3D orientation (and eventually position, even if it is highly challenging for low-cost sensors) of the platform.

The gyroscope measures rotation speed in three dimensions. The measurement rate ranges from 50 Hz up to 500 Hz. To obtain orientation information, one can integrate the data from the gyroscope, giving only a relative estimation on the rotation of the device from one measurement to the next. It leads to error accumulation, also known as drift, when measuring a biased sensor, which is always the case for MEMS gyroscopes. This type of sensor is the least noisy of the three, but as it only gives a relative estimation and it can drift, either fusion or specific filtering are preferably to be performed before using its measurements.

The accelerometer indicates the mobile acceleration that is composed of the gravity and the mobile's own acceleration. In the MEMS case, the sensor is usually very noisy. It is therefore very challenging to retrieve the true mobile acceleration from it, and even harder to estimate the speed or the position, as it involves integration of a highly noisy signal. Therefore the accelerometer is usually only used to deduce the direction of the gravity, providing an estimation of the mobile orientation without any integration needed.

The magnetometer estimates the earth magnetic field direction and so the magnetic north. Similarly to the accelerometer, the measures are very noisy. In addition, magnetic perturbations add to the noise; the effects known as "soft iron" and "hard iron" lead to distortion in the local magnetic field. The hard iron is due to a magnetic reflection from an object, the soft iron comes from interferences in the magnetic field, for instance due to a cellphone.

For motion estimation, a problem that arises is to adopt proper motion model representation. This will impact heavily some algorithmic and implementation choices and limitations.

A pinhole projective model is the classical model used for embedded video applications.

In two dimensions, the problem revolves around restrictions to the planar motion, going from a pure translation to perspective models, and even some more specific ones.

In 3D the main concern is the type of rotation representations that can lead to singularities, difficulties in interpretation, and filtering problems.

The pinhole camera model describes the mathematical relationship between a 3D object viewed by the camera and its 2D projection on the image.

It possesses many limitations: it does not take into account the focus of the camera which creates blur and it does not directly model the discretization that occurs when translating projected image into pixels. In addition, image distortions due to lenses are not considered.

However, this model is considered as a sufficient geometric approximation for many applications. The real final image plane presents a 180° rotation due to image rays crossing at the pinhole location.

As one can see on FIG. 1, the real final image plane presents a 180° rotation due to image rays crossing at the pinhole location. To simplify computation, a virtual image plane is often considered in front of the pinhole. All equations presented in this disclosure will be based on this virtual image, which will now directly be referred to as the image to clarify and lighten the subject.

Figure 2:
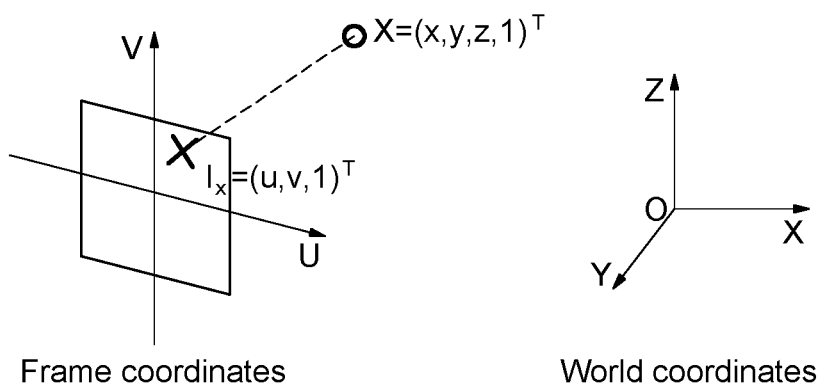
FIG. 2 illustrates coordinates notation.

We now consider a point X in 3D world homogenous coordinates: $X=(x, y, z, 1)^T$. The quantities x, y and z represent the world coordinates of the point. The image projection of the point X is noted $I_x$ with its 2D pixel coordinates $I_x=(u,v,1)^T$, u and v being the horizontal and vertical pixel coordinates respectively. A scheme of this representation is displayed on FIG. 2.

The pinhole camera model describes the relationship between X and $I_x$.

This is made in two steps.

The first step explicitly models the geometric position and orientation of the camera with respect to world coordinates. This information is contained in a 3×4 projection matrix $P=[R|t]$, where R is a 3×3 rotation matrix that encodes the orientation of the camera, and t a column vector of 3 elements, representing the position of the pinhole center of the camera.

The second step involves the transformation of the projection into pixel points. This is modeled by a camera matrix K. In some studies, K is named the instrinsic matrix.

$$K = \begin{pmatrix} f & 0 & c_x \\ 0 & f & c_y \\ 0 & 0 & 1 \end{pmatrix}$$

where f is the focal length of the camera, and $(c_x, c_y)^T$ the principal point of the camera, that defines the projection of the camera principal rays into the image's plane.

Note that a square pixel is considered here, otherwise it is needed to define two distinct focal lengths for the horizontal and vertical axis of the camera. The complete relationship between pixel location $I_x$ and 3D coordinates X is thus: $I_x=KPX$ While one may consider on-the-fly computation of both K and P matrices, the camera matrix can be computed once in a calibration process and then is considered fixed. The method disclosed in Zhang, Z., 2000, *A Flexible New Technique For Camera Calibration, IEEE Transactions on Pattern Analysis and Machine Intelligence,* 22(11), pp. 1330-1334, can be used for example in order to compute the intrinsic camera matrix K.

A 2D transformation between two frames can be expressed in many different manners. To keep the notation homogenous and simple, the transformation using the coordinates changes of a point is represented. A 2D homogenous point $I_x=(u, v, 1)^T$ in the first frame (for example the previous frame) is mapped to a point $I'_x=(u', v', 1)^T$ in the second frame (for example the current frame) by the transformation.

The first type of motion that can be modeled is a direct translation $T=(T_x, T_y)$. It is has a very simple effect on the coordinates:

$$I'_x = \begin{pmatrix} u' \\ v' \\ 1 \end{pmatrix} = \begin{pmatrix} u + T_x \\ v + T_y \\ 1 \end{pmatrix}.$$

The main characteristic of this motion model is that it only has 2 degrees of freedom. Therefore it is computable from only one point correspondence from a local motion estimation technique or a global one such as integral projections.

The limitation in terms of motion is very restrictive, and makes it only usable for very closely recorded frames, for example for video encoding, where every block's motion is estimated with a local translational motion model. This type of model can also be used in panorama and stabilization, if in-plane rotation is not considered.

Another type of 2D motion model is the rotation-preserving isometry, which correspond to an in-plane rotation by an angle θ combined with a translation:

$$I'_x = \begin{pmatrix} u' \\ v' \\ 1 \end{pmatrix} = \begin{pmatrix} \cos(\theta) & -\sin(\theta) & T_x \\ \sin(\theta) & \cos(\theta) & T_y \\ 0 & 0 & 1 \end{pmatrix} \begin{pmatrix} u \\ v \\ 1 \end{pmatrix}.$$

Only one degree of freedom is added to the translation model, but has a point correspondence that provides two pieces of data, two point correspondences are used to compute the isometry. This motion model is widely used for video stabilization, providing translational and rotational movement estimation that can be filtered. It is also sometimes used in tracking applications, when the size of the object on the image is not expected to change during the sequence.

For non-subsequent image motion estimation, scale changes can to be added to the motion model. This type of model is called a similarity transformation, with a scale change of Z:

$$I'_x = \begin{pmatrix} u' \\ v' \\ 1 \end{pmatrix} = \begin{pmatrix} Z\cos(\theta) & -Z\sin(\theta) & T_x \\ Z\sin(\theta) & Z\cos(\theta) & T_y \\ 0 & 0 & 1 \end{pmatrix} \begin{pmatrix} u \\ v \\ 1 \end{pmatrix}.$$

The augmentation of the model with scale opens up many application domains: long term tracking, recognition, etc.

Certain types of motions can lead to a deformation in the shape of the image. To include some simple transformations such as stretching or skewing it is needed to increase the number of parameter in the model:

$$I'_x = \begin{pmatrix} u' \\ v' \\ 1 \end{pmatrix} = \begin{pmatrix} a_{11} & a_{12} & T_x \\ a_{21} & a_{22} & T_y \\ 0 & 0 & 1 \end{pmatrix} \begin{pmatrix} u \\ v \\ 1 \end{pmatrix}.$$

This type of representation is an affine transformation. For instance this model is mapped to deduce specific deformations, created by motions recorded with a rolling shutter sensor. The extension to affine model was used as these distortions do not preserve the shape of the image. As the degree of freedom is increased to 6, three point correspondences are used to create this type of representation.

The last extension of this type of representation presented here is the projective transformation. The form of the transformation is the following:

$$I'_x = \begin{pmatrix} u' \\ v' \\ w' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} u \\ v \\ 1 \end{pmatrix}.$$

Note than the third coordinate is modified in the final image point to $I'_x$, to retrieve the final location of the point on the image, one should divide the coordinates of the point by w'. This model is used when modeling "out-of-plane" transformations, for instance 3D rotations. It is useful in applications using the tracking of a planar structure moving freely in a scene.

3D motion representation is a complex subject. Many types of model exist, but only the most applied in the context of general motion estimation purposes is indicated here.

Many representations for three dimensional rotations exist.

One of them comprises quaternions.

Quaternions possess a lot of mathematical history and backgrounds. They constitute a group based on the four dimensional vector set $R^4$ with specific operator for multiplication '$\bigcirc$'. The sub-group $S^3$ corresponds to quaternions of unit length, and is used to represent rotations. A quaternion $q=[q_x, q_y, q_z, q_w]^T$ encodes a rotation of angle $\theta$ around a unit 3D axis $\mu$ as:

$$[q_x, q_y, q_z, q_w]^T = \left[\mu\sin\left(\frac{\theta}{2}\right), \cos\left(\frac{\theta}{2}\right)\right]^T.$$

Formulas used to compute a rotation matrix R and its partial derivates based on quaternions members are well known by the man skilled in the art. As for rotation matrices, quaternions possess more members (4) than the degree of freedom of a 3D rotation (3). When performing filtering or optimization on quaternions representing rotations, one must ensure that their length is kept unit. This is very simply done by dividing each member of the quaternion by the total norm of it, which is much simpler than the orthonormalization required by rotation matrices.

Quaternions have numerous advantages over Euler angles (see below) and direct rotation matrices when it comes to representing rotations, they offer a good balance between numerical properties and do not present artifacts. They are widely used for inertial sensor fusion.

A rotation can be represented as a 3×3 matrix R. Every column of it are of unit length and mutually orthogonal, and the determinant of the matrix is +1. This type of matrix constitutes the SO(3) (for special orthogonal) group. Each matrix belonging to this group is a 3D rotation, and any composition of matrices from this group is a rotation. This representation of a rotation is the most direct one to apply, as a 3D point $X=(x, y, z, 1)^T$ is transformed by R to a point $X_{rot}=(x_{rot}, y_{rot}, z_{rot}, 1)^T$ by a simple 4×4 matrix multiplication based on the rotation R:

$$X_{rot} = \begin{pmatrix} R & 0 \\ 0 & 1 \end{pmatrix} X.$$

It must be noted that most of the other rotation representations are converted to a rotation matrix to be applied. The main drawback of the rotation matrix is the complexity of the constraints to keep the matrix in the SO(3) group when applying optimization of filtering techniques. In effect, those techniques will modify the coefficients of the matrix, but it should always be orthonormalized to belong to the SO(3) group. This is done at heavy cost and is performed at each step of the algorithm where the matrix is modified.

Euler angles are the most used representation for 3D rotations. It consists in separating the rotations to a minimal 3 angle values that represent the respective rotations around the axis of the coordinates in a sequential way. They are referred to as the yaw, the pitch and the roll angles. These three values are either expressed in degrees or radians. In order to apply the transformation to a point, the Euler angles are transformed into separate rotation matrices, which are combined to form the total rotation matrix that is then applied to the point. In this disclosure, it is referred to the yaw as $\alpha$, the pitch as $\beta$, and the roll as $\gamma$. A big issue in using Euler angles is to establish a convention on the order of application of the angles. In effect, one can select which angle represents a rotation around an axis, as well as the order chosen to apply them. This can create confusion and misunderstandings.

Figure 3:
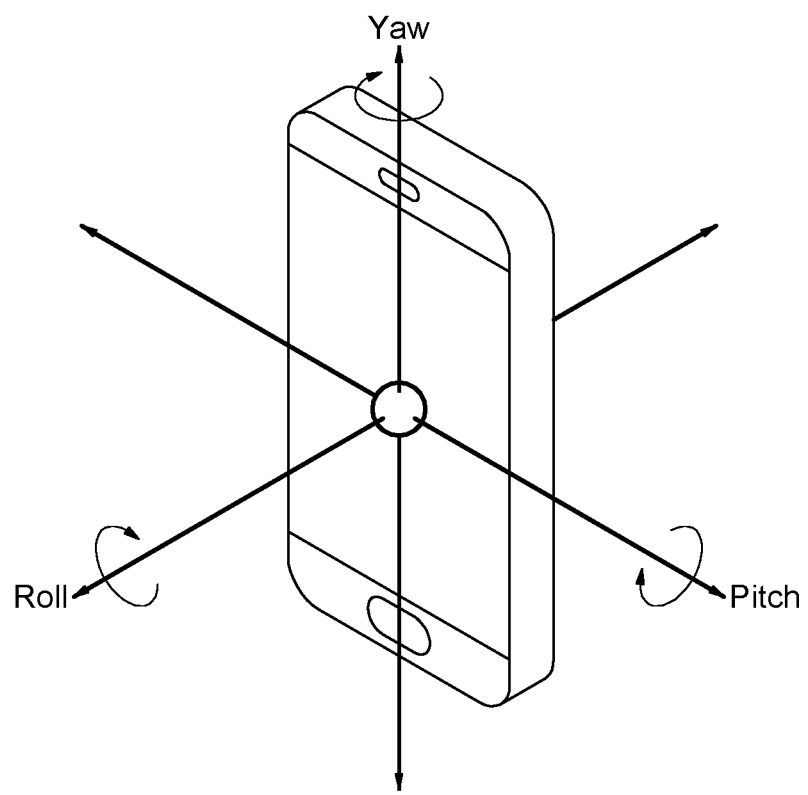
FIG. 3 illustrates a smartphone with an example of Euler angles, FIGS. 4 to 8 detail an example of a descriptor generation according to an embodiment of a method according to the disclosure.
Figure 4:
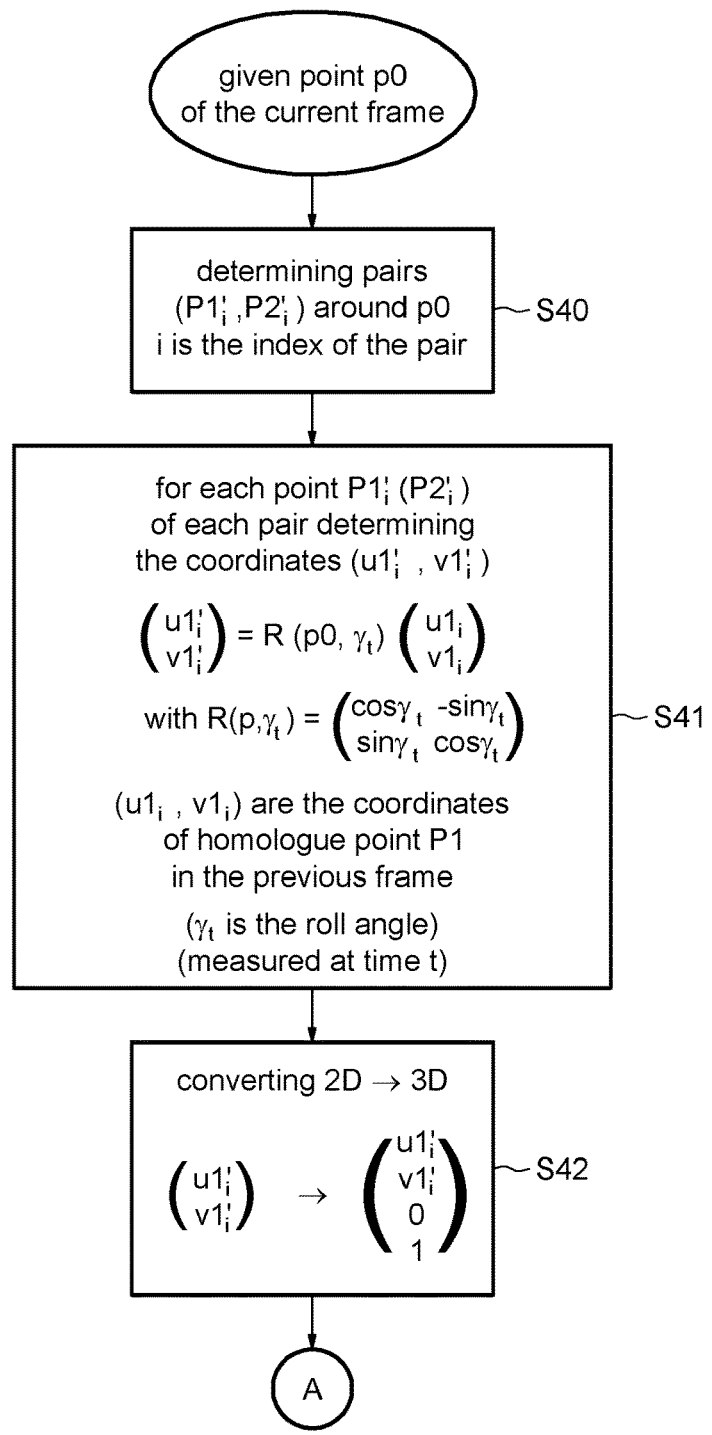
Figure 5:
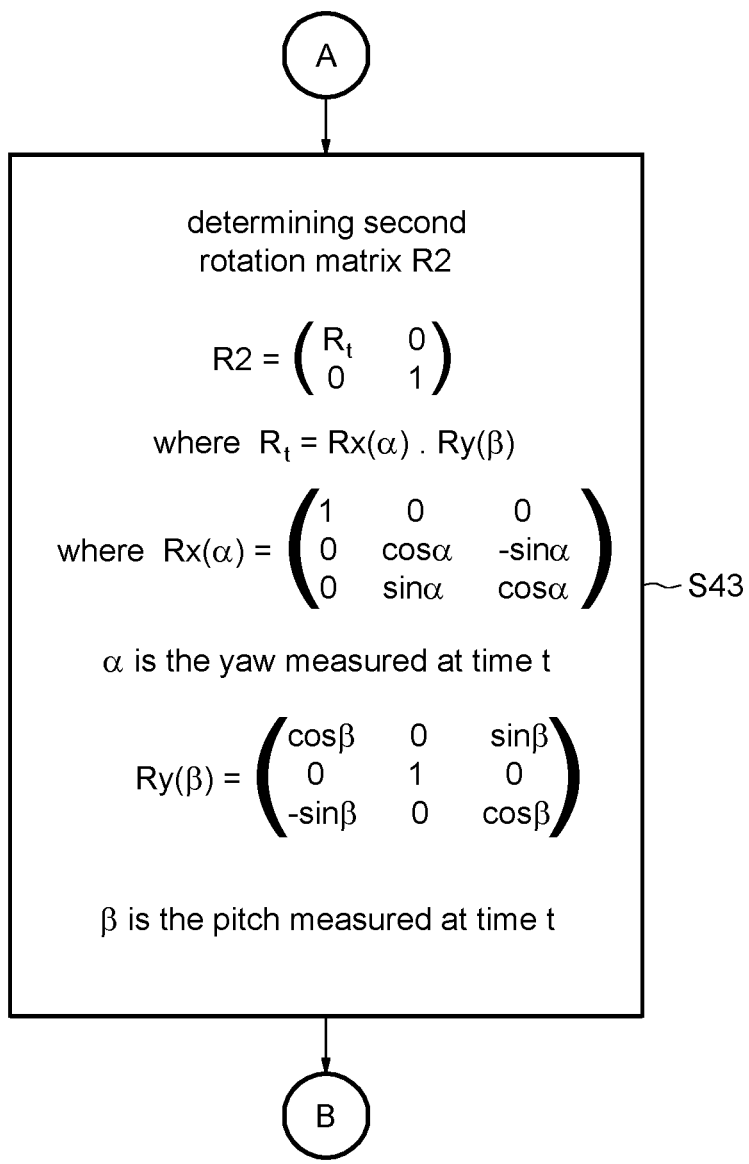
Figure 6:
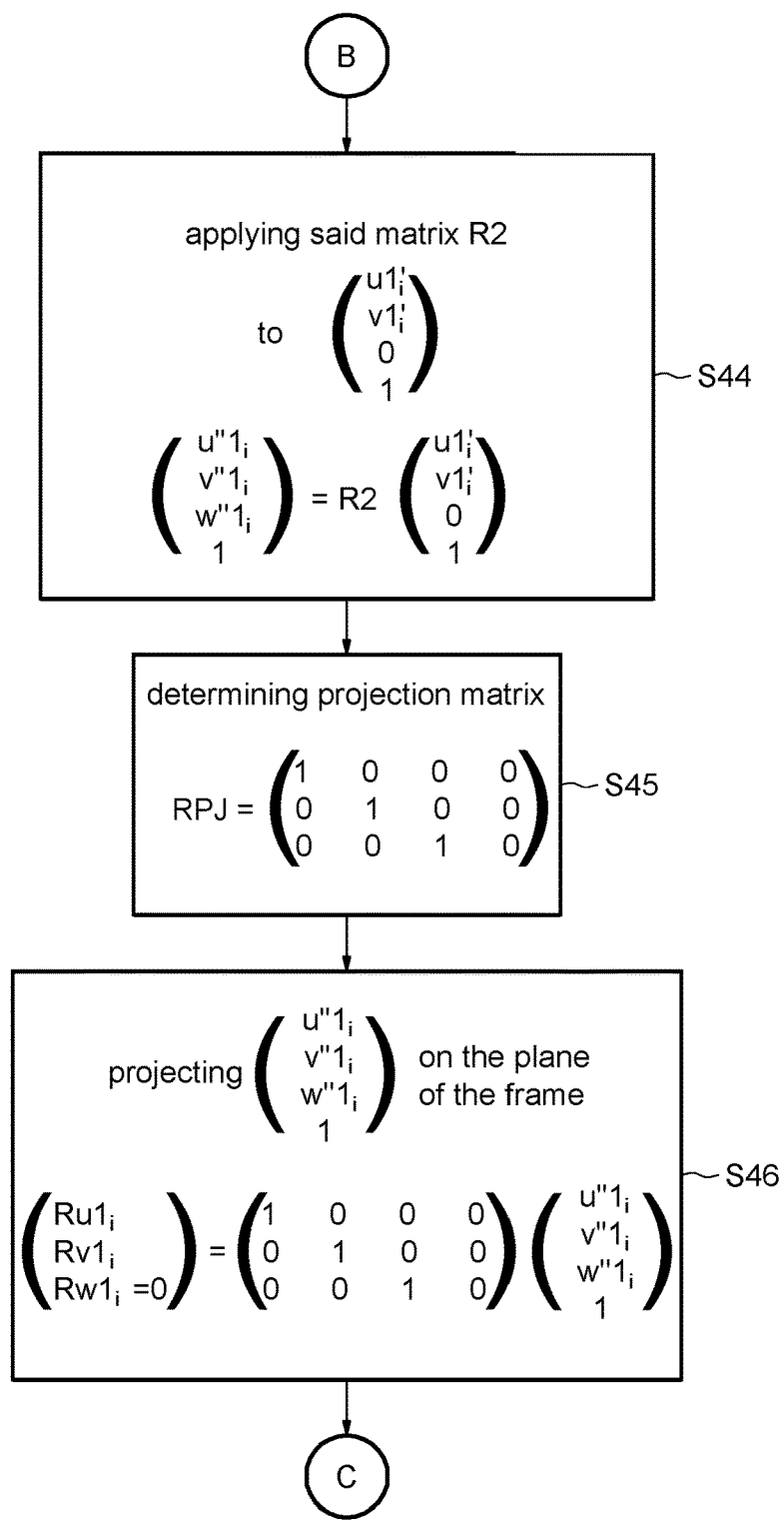

In FIG. 3, an example of the axis displayed on a smartphone scheme is represented.

A 3D motion is a combination of a rotation and a translation $\tau=[\tau_x, \tau_y, \tau_z]^T$. As seen previously, one converts a rotation to a rotation matrix in order to apply it to a point. The complete motion regrouping a rotation R and a translation $\tau$ is applied to a point X by:

$$X' = \begin{pmatrix} R & \tau \\ 0 & 1 \end{pmatrix} X.$$

Estimating the frame to frame camera motion in a video sequence is a highly studied problem. It is a key step in many applications: camera stabilization, rolling shutter distortions correction, encoding, tracking, image alignment for High Dynamic Range, denoising . . . .

The first step of this type of technique is generally to extract motion vectors between pairs of images. This is performed by putting in correspondences points from one frame to another.

Many factors can impact the performance of these methods. In a sequence, illumination changes can occur, modifying the pixel values from one frame to another. In-plane rotations create another dimension in the problem, which can no longer be solved as a 2D translation estimation. Motion artifacts, such as motion blur or rolling shutter distortions also intervene in the process, creating variation in terms of pixel values and localizations. Finally, scene characteristics can make a great impact on the results of those techniques: a lack of texture in the scene, low-light heavy noise, etc. . . .

A first category of algorithm makes use of pixel-wise computation. For a set of fixed given points in the first frame, a correspondence is searched in the second frame. This can be performed either for every point, which is generally called optical flow, or in a sparse manner, with techniques such as block matching or tracking.

For block-based/tracking methods, the first stage is selection of points on the first frame (with a grid pattern for instance) or every point for dense methods. Then the technique consists in finding the corresponding locations of the selected points in the second frame.

The main drawback of block-based/tracking methods for pixel motion estimation, is that every pixel does not carry the same amount of useful information. For instance, estimating the motion of a white point on a white wall is much more challenging than a black point on the same wall. To estimate a motion from two images that present changes in terms of conditions and location, one should have robustness to various transformations such as illumination changes, rotation, scale . . . .

Approaches of feature extraction have been designed with the goal of finding locations in the images that carry the most information and distinctiveness. Many types of feature exist, including points, blobs, edges . . . . Points and blobs are however present in most types of sequences which makes them suitable for embedded applications. These points of interest are called keypoints.

The second category of vector generation techniques consists in extracting points of interest (keypoints) in every frame, rather than using fixed points (or every point) in the frame. Descriptors of each set of points are then computed, which consist in a higher-level, more robust information on the surrounding of the keypoint. Correspondences are then drawn between these two set of points, in an operation known as matching.

Many feature detection methods exist.

One of these methods is based on an auto-correlation function a of a point $p=[u, v]^T$ and a shift $[\Delta u, \Delta v]^T$:

$$a(p,\Delta u,\Delta v)=\Sigma_{i=-N}^{i=N}\Sigma_{j=-N}^{j=N}(I(u+i,v+j)-I(u+\Delta u+i,v+\Delta v+j))^2.$$

If this auto-correlation is small in every direction, this translates a uniform region with little interest. Only a strong value in one direction most likely indicates a contour. If every direction displays strong values however, the point is considered as being a keypoint. With a first-order Taylor approximation, the auto-correlation matrix can be expressed in function of spatial derivate of the image. The keypoint evaluation is then made with regard to the eigenvalues $\lambda_1, \lambda_2$ of that matrix. The corner-ness function is:

$$f(p)=\det(a(p))-k(\text{trace}(a(p)))^2=\lambda_1\lambda_2-k(\lambda_1+\lambda_2)^2.$$

If this value at pixel p is higher than a threshold and higher than cornerness function $f$ evaluated on neighborhood points, the point is considered a corner. The threshold can be set in function of the total desired number $N_{corners}$ of corners, or an absolute quality desired. The fact that the detectors consider all directions of a gradient matrix induces its robustness to illumination changes as well as in-plane rotations.

Other methods have been designed based on the gradient matrix to detect corners.

A very light extractor in terms of computational time known by the man skilled in the art under the acronym FAST (Features from Accelerated Segment Test) has been disclosed in:

Rosten, E. & Drummond, T., 2006. *Machine Learning For High-Speed Corner Detection, Lecture Notes in Computer Science (including subseries Lecture Notes in Artificial Intelligence and Lecture Notes in Bioinformatics)*, 3951 LNCS, pp. 430-443, and Rosten, E., Porter, R. & Drummond, T, 2010, *Faster and Better: A Machine Learning Approach to Corner Detection, Pattern Analysis and Machine Intelligence, IEEE Transactions on*, pp. 1-35.

FAST is an algorithm to extract keypoints designed to be the lightest possible strategy, sparing computational resources for other tasks. It is a corner detector based on the Bresenham circle of radius 3 around a point p, which is simply the "pixelized" version of a circle. This circle contains 16 points, if a certain amount $N_{radius}$ of contiguous points' intensities are all either lower or brighter than the point p (plus/minus a threshold $\tau$), the point p is considered a corner.

It has been shown that using the $N_{radius}=9$ (9 contiguous points are used to detect a corner) was a very good choice compared to other values, such as $N_{radius}=12$.

The main drawbacks of this feature detector are:
Reliance on a threshold $\tau$ that highly influences the performance of the extractor.
No detection on multiple scale, it is only a corner detector. It is however possible to achieve multiple scale detection thanks to pyramidal strategies.
It is highly sensitive to image noise, as a single pixel that changes value can break the contiguous pixel arc.

Several detectors have been developed to cope with scale invariance. They consist in searching the scale-space dimensions of the image and finding the extremas of an operator, which can be the gradient, Laplacian, etc. The image is first convolved by a Gaussian Kernel to smooth noise. Values are then normalized with respect to scale, and a point that possesses the highest absolute value of the neighborhood is then considered an interest blob (a keypoint with higher scale than just a pixel). The Laplacian has been demonstrated to be the best operator to choose.

In this context, the so-called SIFT detector is presented in Lowe, D. G., 2004, *Distinctive Image Features from Scale-invariant Keypoints., pp.* 1-28, and makes use of the difference of Gaussian approach between scales. For every scale, the Laplacian operator is approximated by a difference between two Gaussian smoothed images with different values for Gaussian smoothing. Maxima/minima are then detected by comparing every point with its direct neighborhood in the space scale dimensions, reducing the number of comparisons to only 26 neighbors.

Keypoints descriptors techniques have been also developed to provide invariant representation of the surroundings of the desired area. The SIFT descriptor is a robust keypoint descriptor. The descriptor is based on the scale extracted from the keypoint as explained above. It determines a dominant rotation in the scaled patch around the point. Image gradients are then computed in zones, and a soft assignment is made to map them into 8 discrete orientations. The normalized histogram of gradients strength into each direction for every spatial zone constitutes the descriptor. It is a 128-dimensional vector of continuous numbers: 4×4 spatial zones times 8 orientations.

SIFT is still a widely used descriptor but its main drawback being that the L2-norm (also known as Euclidian norm) between two 128-dimensional vector can become very expensive to compute, especially when computing similarities between many points.

Taking into account the computer quickness in computing the binary Hamming distance (just a XOR operation followed by a bit count), recent techniques were developed to produce binary descriptors.

Binary descriptors and light detectors (such as FAST) provide simple yet effective methods to perform local motion estimation with a maximum efficiency of computation. However, binary descriptors and light detectors also raise some drawbacks:

Descriptors are binary and neither very flexible nor interpretable: one cannot extract information or modify the descriptor directly.

As matching techniques will be used, the error on measurement is not easy to model, which can be a problem for filtering or optimization techniques.

Some of the binary descriptors are known for presenting slightly lower robustness to geometric changes than more complex ones.

An example of binary descriptor is the one called "Binary Robust Independent Element Features (BRIEF)", which utilizes pairwise comparisons along a determined pattern to build a binary string descriptor. The pattern is built with a random generation technique based on a Gaussian sampling that has been proven superior against other sampling strategies.

More precisely, the BRIEF descriptor generation has been introduced in Calonder, M. et al., 2010, BRIEF: Binary Robust Independent Elementary Features, Proceedings of the European Conference on Computer Vision. ECCV'10. pp. 778-792. It is based on a pattern of point correspondences around the point p to be described. Many types of pattern exist.

Given a pattern of predefined pairs $(C_i, C'_i)$ in the pixel patch around the point p, the BRIEF descriptor $D_p$ is built as follows:

Every pixel in the patch is smoothed with a 9×9 Gaussian Kernel with a σ value of 2 (multiple values of the parameters where tested, these ones had the best results);

For every pair $(C_i, C'_i)$:

if $I(C_i) < I(C'_i)$ then $D_p(i)=1$, otherwise $D_p(i)=0$,

Where $D_p(i)$ is the value of the binary descriptor $D_p$ at index i. The total number of pairs $n_d$ is very often a multiple of 8, therefore the descriptor has a length of $n_d/8$ bytes. The common values for $n_d$ are 128, 256 or 512. Comparisons between two descriptors are made with the Hamming distance, which is simply computed with a XOR operation followed by a bit count that can be implemented very efficiently on a classical processor.

As a Gaussian blur is applied before performing the comparisons, the BRIEF descriptor is robust to noise. However, it is not robust to in-plane rotations. With its high speed of computation and matching, it is a very adapted descriptor for video sequences frame-to-frame local motion estimation, but is not the ideal descriptor for longer term estimation. However BRIEF is not robust to scale or rotation changes.

To further improve robustness of the descriptors to rotation, a gravity oriented version of SIFT has been proposed. Rather than performing a visual technique to extract the dominant orientation of the patch, the readings of an accelerometer are used.

Inertial sensors bring information on the orientation of the smartphone that is used to increase robustness to geometric transformations. They can also be used to predict the motion of the platform to adapt the search window of a technique. However, they do not bring any valuable addition to scale computation of a keypoint, which can only be computed from visual sensor recordings.

Although a binary descriptor based on pairwise comparisons along a determined pattern, such as the BRIEF descriptor, is a very adapted descriptor for video sequences frame-to-frame local motion estimation, it is neither robust to in-plane rotation nor to viewpoint changes (yaw and pitch variations). While this lack of robustness is not necessary for a frame-to-frame memory less motion estimation, it is problematic for longer terms tracking of points. If an update of the descriptor is needed at every matching step, a simple mismatch can lead to wrong data association.

In this context, an improvement upon such binary descriptor, for example the original BRIEF descriptor, is proposed in order to increase its robustness to geometric changes while not adding to much complexity to such descriptor.

Inertial sensors offer direct orientation estimation in 3 dimensions. This implies that thanks to inertial measurements, one is able to compute an absolute orientation of the descriptor.

To perform invariance with regard to rotation, it would be possible to rotate the image with the orientation information, and then use a detector/descriptor strategy. However it is not a very efficient way to use this information. Furthermore, with high yaw/pitch angles, the image would become too flat to bring valuable visual information.

One characteristic of binary descriptors is to use a fixed pattern of point's pairs to apply comparisons.

According to an embodiment of the disclosure, it is proposed to directly use the 3D rotation information on the pattern of point pairs.

This allows much less computations than a full frame rotation, as for example the BRIEF pattern can contain up to 512 points, while for instance a 1280×720 pixel frame presents 921600 points.

In modern smartphones or tablets, inertial sensors such as gyroscope, magnetometer and accelerometer are present and integrated, with inertial fusion algorithms often already implemented in hardware that computes orientation estimation.

Many sensors are directly available, with two orientation fusion hardware already present. Therefore it is proposed to use directly those data to estimate orientation, as they present no additional computational load, and are most likely taking account of some form of calibration.

An example of detailed choices of implementation of the binary descriptors generation method is now indicated.

In-plane rotation invariance can be obtained through rotation of the pattern of a binary descriptor.

Thanks to the use of inertial sensors, it is possible to have an estimation of the 3D rotation in Euler angles, noted $\alpha_t$, $\beta_t$, $\gamma_t$ being the yaw, pitch, and roll angles respectively measured at time t. Knowing the roll angle, the couples $(pos_i, pos'_i)$ can be rotated around the position p that is described in order to obtain an in-plane invariance of the descriptors:

$$Rpos_i = R(p, \gamma_t) * pos_i$$

where $R(p, \gamma_t)$ is the rotation matrix describing the planar rotation of angle $\gamma_t$ around the feature point p.

The point p is usually taken as the origin of the point's pair correspondences position, and a translation is added to the point's pair rotated positions with the point p coordinates.

This rotation operation advantageously does not need to be performed more than once before describing every point, for every couple $(pos_i, pos'_i)$. For example a 256-bit long descriptor leads to 256 rotations to compute compared to a classical binary descriptor strategy. This is a very reasonable cost compared to classical visual invariance extensions that need a visual clue on the feature orientation. As in-plane rotation does not affect the performance of the descriptor method, any angle can be handled with this strategy, achieving complete robustness to roll rotations.

As the BRIEF descriptor describes a planar area around a point with fixed point pair's comparisons, it is not robust to yaw and pitch rotations (viewpoint changes). It would be impossible to make the descriptor fully invariant to these transformations, as high rotations applied to the couples $(pos_i, pos'_i)$ would lead to an overly slim shape of the described area, weakening its discriminating characteristics. For that reason, only small but still problematic angles changes were considered in this disclosure, typically up to 20° for yaw and pitch angles. For roll however, as stated previously, no limitation has to be made.

To apply the rotation exactly, it is needed to convert the point pairs to 3D coordinates: $Xpos_i = (u_i, v_i, 0, 1)^T$ where the coordinates of the points are $pos_i = (u_i, v_i)^T$. The inertial orientation is then converted to a rotation matrix $R_t$.

The points $Xpos_i$ are rotated with $R_t$ to points $X'pos_i$. Then a simple projection with a projection matrix corresponds to a projection of the points back onto a plane:

$$Rpos_i = \begin{pmatrix} Ru_i \\ Rv_i \\ Rw_i \end{pmatrix} = \begin{pmatrix} 1 & 0 & 0 & 0 \\ 0 & 1 & 0 & 0 \\ 0 & 0 & 1 & 0 \end{pmatrix} X'pos_i.$$

Note that any orientation representation can be used, if it is converted into a rotation matrix. With this strategy, the plane of point's pairs is rotated along the orientation measured by inertial sensors.

The projection part only consists in keeping the three first coordinates of the point $X'pos_i$. Therefore the cost of computation is included in the rotation matrix calculus and application to the points, and the division of coordinates of the homogenous point $Rpos_1$.

After those general considerations on the disclosure, particular embodiments of a method for generating a binary descriptor associated with a given point p0 in a current frame of a succession of video frames obtained by an apparatus, for example a camera, belonging in particular to a platform, for example a smartphone or a tablet, are now described in relation with FIGS. 4 to 7.

Generally speaking, according to this embodiment, said method for generating a binary descriptor $D_1$ associated with a given point p0 in a current frame of a succession of video frames obtained by said apparatus, comprises determining (step S40 FIG. 4) a pattern of points pairs $p1'_i$, $p2'_i$ around said given point p0 in the current frame, and performing intensity comparison processing between the two points of each pair (i is the index of the binary descriptor and the index of the pair).

As said apparatus is likely to move in rotation between the previous frame and the current frame (because the platform is likely to move in rotation), generating said binary descriptor further comprises processing said pattern of points $p1'_i$, $p2'_i$ of said current frame with tridimensional rotation information representative of said apparatus rotation between the previous frame and the current frame.

Said tridimensional rotation information is advantageously obtained from inertial measurements.

More particularly processing said pattern of points of said current frame comprises, for each point $p1'_i$ of each pair $p1'_i$, $p2'_i$ of said pattern, determining (step S41) the bidimensional coordinates $(u1'_i, v1'_i)$ of said point $p1'_i$ from the bidimensional coordinates $(u1_i, v1_i)$ of the homologue point $p1_i$ in the previous frame and from an in-plane rotation matrix $R(p0, \gamma_t)$ corresponding to an in-plane rotation of an in-plane angle around said given point p0.

In this example said in-plane angle is the roll $\gamma_t$ measured at time t.

Said given point p0 is advantageously a keypoint which can be extracted by using for example said FAST algorithm.

More precisely, $$u1'_i = u1_i \cos \gamma_t - v1_i \sin \gamma_t.$$

$$v1'_i = u1_i \sin \gamma_t + v1_i \cos \gamma_t.$$

Then (step S42) said determined bidimensional coordinates $(u1'_i, v1'_i)$ of said point $p1'_i$ are converted into tridimensional coordinates $(u1'_i, v1'_i, 0, 1)$. Note that a quaternion is used here Then a second rotation matrix R2 representative of said tridimensional rotation information is determined (Step S43).

Said second rotation matrix R2 takes into account the yaw $\alpha$ and the pitch $\gamma$ measured at time t.

Said second rotation matrix R2 is applied to said tridimensional coordinates $(u1'_i, v1'_i, 0, 1)$ of said point $p1'_i$ to obtain new tridimensional coordinates $(u1''_i, v1''_i, w1''_i, 1)$.

Those new tridimensional coordinates $(u1''_i, v1''_i, w1''_i, 1)$ are the projected back (step S46) onto said plane of said in-plane rotation by using a projection matrix RPJ (step S45) to obtain a projected point $Rp1_i$ having projected coordinates $(Ru1_i, Rv1_i, 0)$.

Figure 7:
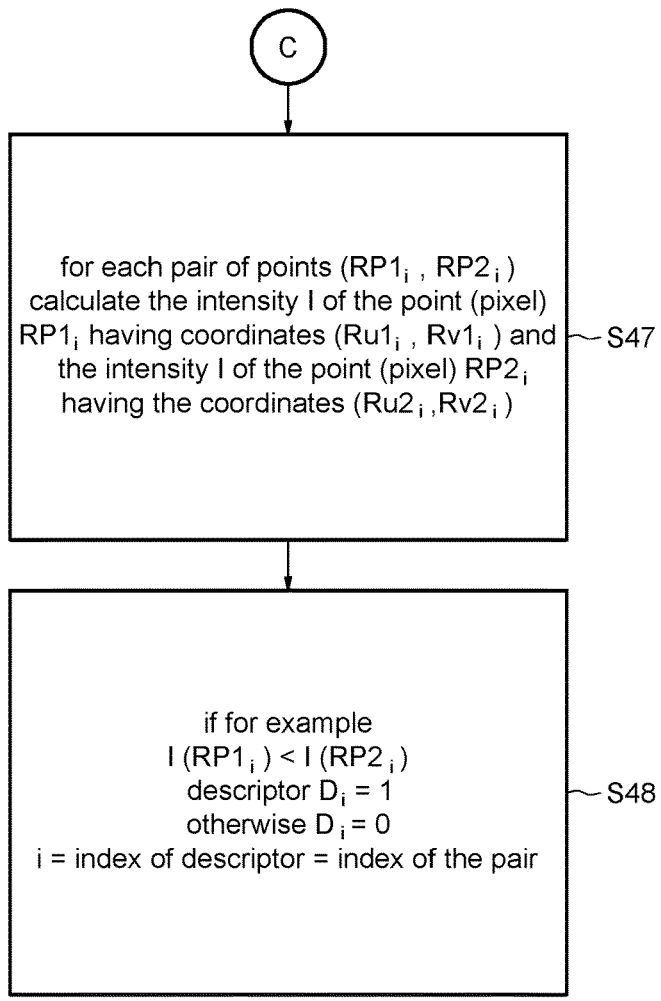

As illustrated in FIG. 7, performing intensity comparison processing between the two points of each pair comprises determining (Step S47) the intensity of the two projected points $(Rp1_i, RP2_i)$ of said pair and comparing both intensities (step S48).

More precisely, for example, if I(RP1i) is smaller than I(RP2i), the binary descriptor Di is equal to 1, otherwise Di is equal to 0.

Figure 8:
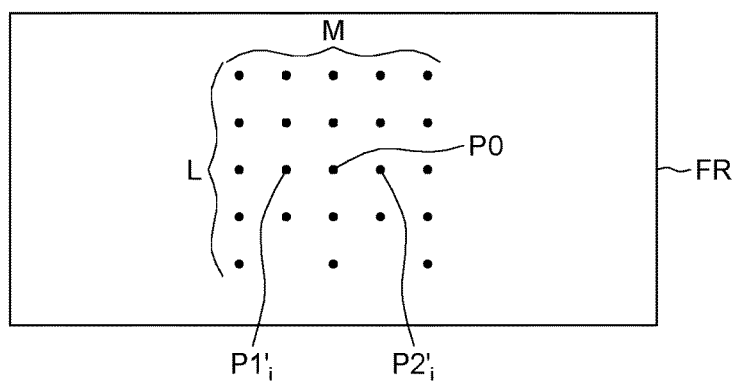

As illustrated in FIG. 8, in the current frame FR, said pattern of points may comprise pairs of points included in a zone of L×M points, for example 25×25, centered on said given point p0. The given point p0 is thus preferably, but not compulsorily, the origin of each point pair $p1'_i$, $p2'_i$.

In other words the two points (pixels) $p1'_i$, $p2'_i$ may be symmetric or not with respect to the given point p0.

Figure 9:
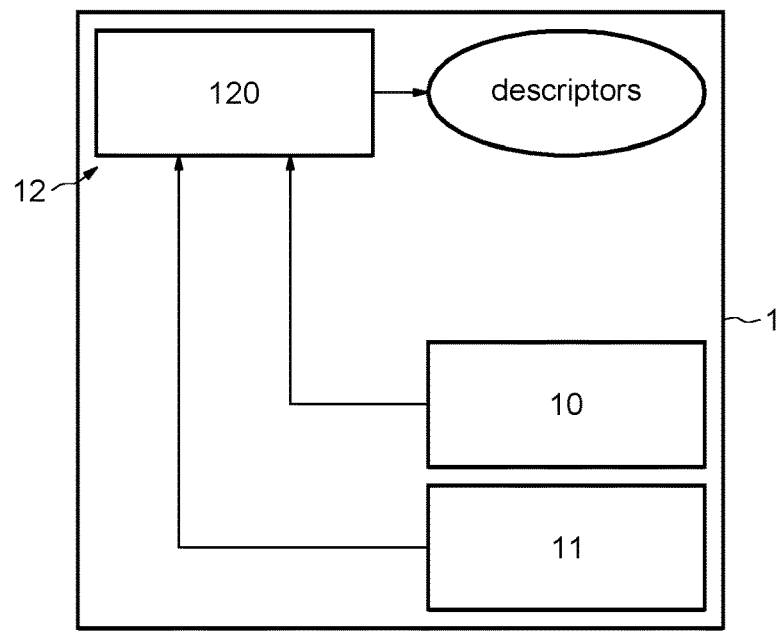
FIGS. 9 and 10 illustrate schematically an embodiment of a device and of a platform according to the disclosure.
Figure 10:
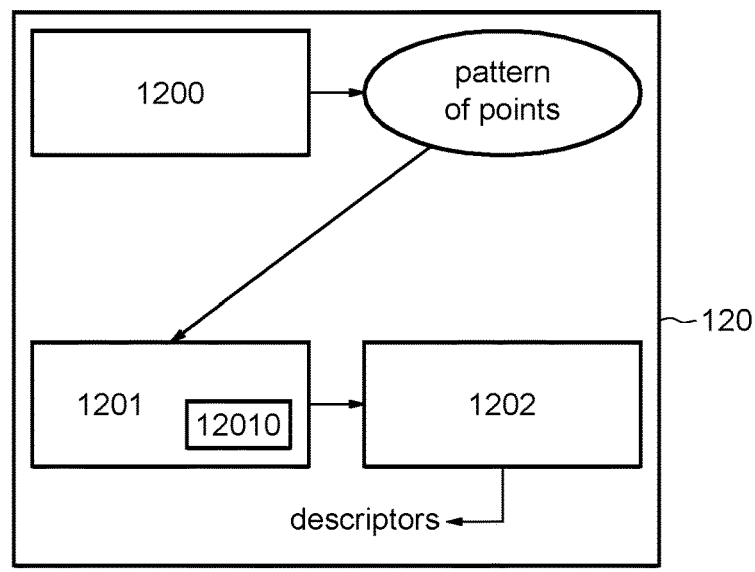

We refer now more particularly to FIGS. 9 and 10, which illustrate diagrammatically an embodiment of a platform 1, for example a smartphone or a tablet according to the disclosure including a device 12 according to the disclosure, an apparatus 10, like an image sensor 10, as for example a camera, and at least one inertial sensor 11 such as a gyroscope. However the gyroscope may be also associated with an accelerometer and even with a magnetometer in some cases.

The device comprises generating means 12 configured to generate the binary descriptor associated with the given point p0 in a current frame FR of a succession of video frames obtained by said apparatus 10.

Said generating means 12 comprising first means 1200 configured to determine the pattern of points pairs $p1'_i$, $p2'_i$ around said given point p0 in the current frame, and comparison means 1202 configured to perform intensity comparison processing between the two points of each pair.

Said generating means further comprises processing means 1201 configured to process said pattern of points $p1'_i$, $p2'_i$ of said current frame with tridimensional rotation information representative of said apparatus rotation between the previous frame and the current frame.

Said tridimensional rotation information is obtained from inertial measurements provided by said at least one inertial sensor 11.

Said processing means comprises a processing module 12010 configured, for each point $p1'_i$, $p2'_i$ of each pair $p1'_i$, $p2'_i$ of said pattern:

to determine the bidimensional coordinates $u1'_i$, $v1'_i$ of said point from the bidimensional coordinates $u1_i$, $v1_i$ of the homologue point $p1_i$ in the previous frame and from an in-plane rotation matrix corresponding to an in-plane rotation of an in-plane angle γt around said given point p0, to convert said determined bidimensional coordinates $(u1'_i, v1'_i)$ of said point $p1'_i$ into tridimensional coordinates $(u1'_i, v1'_i, 0, 1)$, to determine a second rotation matrix representative of said tridimensional rotation information, to apply said second rotation matrix to said tridimensional coordinates $(u1'_i, v1'_i, 0, 1)$ of said point $p1'_i$ to obtain new tridimensional coordinates $(u1''_i, v1''_i, w1''_i, 1)$, and to project said new tridimensional coordinates $(u1''_i, v1''_i, w1''_i, 1)$ back onto said plane of said in-plane rotation to obtain a projected point $Rp1_i$ having projected coordinates $(Ru1_i, Rv1_i, 0)$.

Said comparison means are configured to determine the intensity of the two projected points $Rp1_i$, $RP2_i$ of said pair and to compare both intensities.

The generating means and the comparison means may be realized for example by a microprocessor executing software modules stored on a nontransitive computer readable medium.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating a binary descriptor associated with a given point in a current frame of a succession of video frames obtained by an apparatus configured to move in a rotation between a previous frame and the current frame, the generating including determining a pattern of point pairs of points around said given point in the current frame, performing intensity comparison processing between the points of each pair, and processing said pattern of point pairs of said current frame with tridimensional rotation information representative of said apparatus rotation between the previous frame and the current frame, wherein processing said pattern of points of said current frame comprises, for each point of each point pair of said pattern:
determining bidimensional coordinates of said point from bidimensional coordinates of a homologue point in the previous frame and from an in-plane rotation matrix corresponding to an in-plane rotation, in a plane, of an in-plane angle around said given point;
converting said determined bidimensional coordinates of said point into tridimensional coordinates;
determining a second rotation matrix representative of said tridimensional rotation information;
applying said second rotation matrix to said tridimensional coordinates of said point to obtain new tridimensional coordinates; and
projecting said new tridimensional coordinates back onto said plane of said in-plane rotation to obtain a projected point having projected coordinates; and
processing the succession of video frames based on the binary descriptor.

2. The method according to claim 1, wherein said tridimensional rotation information is obtained from inertial measurements.

3. The method according to claim 1 wherein performing intensity comparison processing between the points of each point pair comprises determining intensities of the projected points of said point pair and comparing the intensities.

4. The method according to claim 1, wherein said given point is an origin of each point pair.

5. The method according to claim 1, wherein the points of said pattern of point pairs are included in a zone of L×M points centered on said given point.

6. The method according to claim 1, wherein said given point is a keypoint of said current frame.

7. The method according to claim 1, wherein said apparatus belongs to a platform.

8. The method of claim 1 wherein the processing the succession of video frames based on the binary descriptor includes at least one of:

video stabilization;
panorama creation;
denoising; and
modifying image dynamics.

9. A device, comprising:
generating means for generating a binary descriptor associated with a given point in a current frame of a succession of video frames obtained by an apparatus configured to move in a rotation between a previous frame and the current frame, said generating means including first means for determining a pattern of point pairs of points around said given point in the current frame, and comparison means for performing intensity comparison processing between the points of each point pair, and processing means for processing said pattern of point pairs of said current frame with tridimensional rotation information representative of said apparatus rotation between the previous frame and the current frame, wherein said processing means for processing said pattern of pair points comprises a processing module configured, for each point of each point pair of said pattern, to:
determine bidimensional coordinates of said point from bidimensional coordinates of a homologue point in the previous frame and from an in-plane rotation matrix corresponding to an in-plane rotation, in a plane, of an in-plane angle around said given point;
convert said determined bidimensional coordinates of said point into tridimensional coordinates;
determine a second rotation matrix representative of said tridimensional rotation information;
apply said second rotation matrix to said tridimensional coordinates of said point to obtain new tridimensional coordinates; and
project said new tridimensional coordinates back onto said plane of said in-plane rotation to obtain a projected point having projected coordinates; and,
means for processing the succession of video frames based on generated binary descriptors.

10. The device according to claim 9, wherein said processing means are configured to receive said tridimensional rotation information from inertial measurements provided by at least one inertial sensor.

11. The device according to claim 9 wherein said comparison means are configured to determine respective intensities of the projected points of said point pair and to compare the intensities.

12. The device according to claim 9, wherein said given point is an origin of each point pair.

13. The device according to claim 9, wherein said pattern of point pairs is included in a zone of L×M points centered on said given point.

14. The device according to claim 9, wherein said given point is a keypoint of said current frame.

15. The device of claim 9 wherein processing the succession of video frames based on generated binary descriptors includes at least one of:
video stabilization;
panorama creation;
denoising; and
modifying image dynamics.

16. A tablet platform, comprising:
an apparatus configured to capture a succession of video frames including a current frame and a previous frame and configured to move in a rotation between the previous frame and the current frame; and
a device including:
generating means for generating a binary descriptor associated with a given point in the current frame, said generating means including first means for determining a pattern of point pairs of points around said given point in the current frame, and comparison means for performing intensity comparison processing between the points of each point pair, and processing means for processing said pattern of point pairs of said current frame with tridimensional rotation information representative of said apparatus rotation between the previous frame and the current frame, wherein said processing means for processing said pattern of pair points comprises a processing module configured, for each point of each point pair of said pattern, to:
determine bidimensional coordinates of said point from bidimensional coordinates of a homologue point in the previous frame and from an in-plane rotation matrix corresponding to an in-plane rotation, in a plane, of an in-plane angle around said given point;
convert said determined bidimensional coordinates of said point into tridimensional coordinates;
determine a second rotation matrix representative of said tridimensional rotation information;
apply said second rotation matrix to said tridimensional coordinates of said point to obtain new tridimensional coordinates; and
project said new tridimensional coordinates back onto said plane of said in-plane rotation to obtain a projected point having projected coordinates; and
means for processing the succession of video frames based on generated binary descriptors.

17. The platform according to claim 16, further comprising at least one inertial sensor configured to provide said tridimensional rotation information.

18. The platform according to claim 16 wherein said comparison means are configured to determine respective intensities of the projected points of said point pair and to compare the intensities.

19. The platform according to claim 16, wherein said pattern of point pairs is included in a zone of L×M points centered on said given point.

20. The platform of claim 16 wherein processing the succession of video frames based on generated binary descriptors includes at least one of:
video stabilization;
panorama creation;
denoising; and
modifying image dynamics.

* * * * *